United States Patent

Mibe et al.

[11] Patent Number: 5,323,883
[45] Date of Patent: Jun. 28, 1994

[54] FRICTION DEVICE

[75] Inventors: Takahiro Mibe, Yamato; Koichi Akiyama, Yokohama; Yoshio Jinbo, Hiratsuka; Akihiko Ozawa, Kawachi; Hiromichi Matsui, Atsugi, all of Japan

[73] Assignee: Nissan Motor Company, Limited, Yokohama, Japan

[21] Appl. No.: 29,296

[22] Filed: Mar. 8, 1993

Related U.S. Application Data

[63] Continuation-in-part of Ser. No. 820,408, Jan. 15, 1992, abandoned, which is a continuation-in-part of Ser. No. 409,664, Sep. 20, 1989, abandoned.

[30] Foreign Application Priority Data

Sep. 20, 1988 [JP] Japan ................. 62-233777
Sep. 20, 1988 [JP] Japan ................. 63-233778

[51] Int. Cl.⁵ ............................................ F16D 69/02
[52] U.S. Cl. ........................... 188/251 R; 188/251 A; 188/251 M
[58] Field of Search .......... 188/251 A, 251 R, 251 M, 188/218 XL; 192/107 M; 420/27; 148/321

[56] References Cited

U.S. PATENT DOCUMENTS

| | | |
|---|---|---|
| 2,633,438 | 3/1953 | Uhle ..................... 148/321 |
| 3,120,882 | 2/1964 | Maloney ............... 188/251 M |
| 3,620,334 | 11/1971 | Derby et al. ........... 188/251 M |
| 3,767,386 | 10/1973 | Ueda et al. ............ 188/251 M |
| 4,197,352 | 4/1980 | Emmett et al. ........ 188/251 A |
| 4,420,067 | 12/1983 | Yamamoto et al. .... 188/251 M |
| 4,596,606 | 6/1986 | Kovacs et al. ........ 148/321 |
| 4,605,105 | 8/1986 | Ogiwara ................ 188/251 M |
| 4,926,978 | 5/1990 | Shibata et al. ........ 188/251 M |

FOREIGN PATENT DOCUMENTS

| | | |
|---|---|---|
| 2440675 | 3/1976 | Fed. Rep. of Germany . |
| 3637022 | 5/1987 | Fed. Rep. of Germany . |
| 0080749 | 5/1981 | Japan ..................... 420/27 |
| 63-297833 | 5/1987 | Japan . |
| 62-015281 | 6/1987 | Japan . |
| 2-212635 | 8/1990 | Japan . |
| 0309972 | 7/1971 | U.S.S.R. ................. 420/27 |
| 1097703 | 6/1984 | U.S.S.R. . |
| 1085715 | 10/1967 | United Kingdom . |
| 2083146 | 3/1982 | United Kingdom . |

OTHER PUBLICATIONS

Kempe's Engineers Year-Book, 1985; J. P. Quayle, Editor; pp. v, A1/12-13 and C10/2-3.

*Primary Examiner*—Robert Oberleitner
*Assistant Examiner*—Chris Schwartz
*Attorney, Agent, or Firm*—Foley & Lardner

[57] ABSTRACT

An automotive disc brake assembly comprises a disc rotor made of graphite cast iron with a structure of pearlite, and a brake pad made of organic material. The disc rotor has a first thermal conductivity falling in a range from 0.090 to 0.140 cal/cm.sec.°C. The brake pad has second thermal conductivity falling in a range from 0.65 to 3.00 Kcal/mh°C. The second thermal conductivity falls in a range from 0.65 to 0.98 Kcal/mh°C. provided that the second thermal conductivity satisfies the following relationship with the first thermal conductivity:

$$\lambda_R \geqq -0.152 \times \lambda_P + 0.24$$

where, $\lambda_R$ is first thermal conductivity, and $\lambda_P$ is the second thermal conductivity. The disc brake assembly is successful in improving heat check resistance ability which is substantially influenced by thermal conductivity of the disc rotor and the brake pad.

10 Claims, 4 Drawing Sheets

FRICTION DEVICE

This application is a continuation-in-part of application Ser. No. 07/820,408, filed Jan. 15, 1992, now abandoned, which in turn is a continuation-in-part of application Ser. No. 07/409,664, filed Sep. 20, 1989, now abandoned.

BACKGROUND OF THE INVENTION

1. Field of the Invention

The present invention relates to a friction device, such as an automotive brake system, particularly as a disc brake assembly. More specifically, the invention relates to compositions of matter for producing a component of the friction device.

2. Description of the Background Art

Automotive disc brakes are designed to convert kinetic energy into thermal energy and dissipate heat generated owing to this conversion to the atmosphere. The disc brake assembly comprises a disc rotor rotatable with a road wheel and a brake pad carried by a caliper cylinder. The brake pad is brought into contact with the disc rotor for frictionally restricting rotation of the disc rotor, thus restricting rotation of the road wheel.

Conventionally, the disc rotor is formed of a material composition as shown in the following table I.

TABLE I

| JIS | Chemical Composition | | | | | | Tensil | Brinell |
|---|---|---|---|---|---|---|---|---|
| No | C | Si | Mn | P | S | Fe | Strength | Hardness |
| FC25 | 3.35 | 2.1 | 0.6 | 0.02 | 0.1 | Rem | 26.4 | 88.1 |

On the other hand, the brake pad is formed of a material composition as shown in the following table II.

TABLE II

| Composition | Asbestos | Semi-Metallics | Low Steel Non Steel |
|---|---|---|---|
| Asbestos Fiber | 20–50 | — | — |
| Steel Fiber | — | 40–70 | 0–20 |
| Replacement Fiber | — | — | 3–30 |
| Organic Matrix | 10–20 | 5–20 | 5–20 |
| Lubricant | 0–20 | 5–20 | 0–15 |
| Metal | 10–30 | 5–20 | 10–30 |
| Others | 5–20 | 10–20 | 5–40 |

In the recent years, because of advancement of the automotive technologies for providing higher performance in various aspect, such as an internal combustion engine as prime mover, a power train, suspension systems, body structures and so forth, as well as extension of highway networks, occurrences of high speed braking is substantially increased. By repeatedly applying high speed braking, a large amount of kinetic energy is converted into thermal energy for heating the components of the brake. Since heat is accumulated owing to increased repetition of high speed braking, the possibility of inducing heat checks is increased.

It may be possible to use material having high thermal conductivity for forming the brake pad. Such high thermal conductivity brake pads may reduce the occurrence of heat checks. However, the high thermal conductivity causes increased amount of heat to be transferred to the caliper cylinder and then to the associated hydraulic brake circuit. This results in increased possibility of the occurrence of vapor lock.

SUMMARY OF THE INVENTION

Therefore, it is an object of the present invention to provide a friction device which can eliminate the possibility of heat checks and can avoid influence of heat generated to the associated actuation system which operates the friction device. It is also an object of the invention to provide an improved disc rotor.

According to one aspect of the present invention, there is provided an automotive disc brake assembly comprising: a rotor made of graphite cast iron with a structure of pearlite, and a brake pad frictionally engageable with said disc rotor, said brake pad being made of organic material, said graphite cast iron consisting essentially of:

(a) 3.5 to 4.0 percent by weight of carbon,
(b) 1.6 to 2.0 percent by weight of silicone,
(c) 0.5 to 0.8 percent by weight of manganese,
(d) 0.4 to 1.2 percent by weight of molybdenum, and
(e) the remainder essentially iron, said disc rotor having a first thermal conductivity falling in a range from 0.090 to 0.140 cal/cm.sec.°C., said brake pad having a second thermal conductivity falling in a range from 0.98 Kcal/mh°C. an upper limit of a lower range of 0.65 Kcal/mh°C. an upper limit of to 3.00 Kcal/mh° C., said lower range of said second thermal conductivity falling in a range from 0.65 to 0.98 Kcal/mh°C. and satisfying the following relationship against said first thermal conductivity falling in said range from 0.90 to 0.140 cal/cm.sec.°C., $$\lambda_R \geq -0.152 \times \lambda_P + 0.24$$

where, $\lambda_R$ is said first thermal conductivity, and $\lambda_P$ is said second thermal conductivity.

It is found that, in the friction device, such as an automotive brake device, heat check resistance ability is substantially influenced by thermal conductivity of components. It is further found that there is an optimal relationship of thermal conductivities between movement, such as disc rotor, and active components, such as brake pad.

Namely, as is well known and as discussed above, higher thermal conductivity material may have lesser possibility of causing heat checks. On the other hand, higher thermal conductivity material may have lower strength. In order to obtaining satisfactory heat check resistance in the movement made of graphite cast block, thermal conductivity $\lambda_R$ higher than or equal to 0.090 cal/cm.sec.°C., at a normal environmental temperature range, is necessary. In view of the strength, the thermal conductivity $\lambda_R$ is to be limited lower than or equal to 0.140 cal/cm.sec. °C., at the normal environmental temperature range. If the thermal conductivity $\lambda_R$ is higher than 0.140 cal/cm.sec. °C., strength can be lowered into an unacceptable level and as a result, lower heat check resistance. Therefore, as the movement of the friction device, the material is to have a thermal conductivity in a range of 0.090 cal/cm.sec.°C. to 0.140 cal/cm.sec. °C.

On the other hand, in view of avoidance of influence of heat for the actuation system, such as hydraulic actuation system, it is preferred to provide low thermal conductivity for the active component made of organic composition in order to transfer lesser heat to the actuation system. On the other hand, as set forth, since the principle of the friction device is to convert the moving energy into the heat energy for exposing the converted heat energy to the atmosphere for absorbing the moving energy, the minimum thermal conductivity $\lambda_P$ required for effectively absorbing the moving energy is 0.65 Kcal/mh°C. Namely, because the material of the active component is composed of fiber as reinforcement and solid lubricant as lubricating agent, when the thermal conductivity $\lambda_P$ is lower than 0.65 Kcal/mh°C. this will make the active component inoperative for performing frictional effect. On the other hand, in order to successfully avoid influence of the head, the maximum thermal conductivity $\lambda_P$ is limited to be lower than or equal to 3.00 Kcal/mh°C.

It is further found that the thermal conductivity $\lambda_P$ of the active component will influence the heat check resistance ability of the movement. Namely, despite the required thermal conductivity range of individual components as set forth above, another limitation would become necessary in view of combination of the movement and the active component. For instance, when the thermal conductivity in the movement is in the relatively low value within the aforementioned range, optimal heat check resistance can be obtained when the thermal conductivity of the active component is within a further limited range. Through experiments, it is therefore found that the relationship between thermal conductivities $\lambda_l$ and $\lambda_P$ has to satisfy the foregoing formula. By providing thermal conductivities satisfying the foregoing formula, the thermal conductivity of the active material will compensate lower conductivity of the movement.

In accordance with a further object of the invention there is provided as a material for forming the movement, such as disc rotor of the automotive brake device, a graphite cast iron having composition of:

C: 3.5 Wt % to 4.0 Wt %

Si: 1.6 Wt % to 2.0 Wt %

Mn: 0.5 Wt % to 0.8 Wt %

Mo: 0.4 Wt % to 1.2 Wt %

Fe: remainder and inevitable impurity

The matrix structure of the aforementioned composition is in a form of pearlite.

The composition may also contain Ti in a content of 0.05 Wt % to 0.10 Wt %.

The composition may contain up to 0.5 weight percent of phosphorus. Preferably the composition comprises 0.01 to 0.03 weight percent of phosphorus.

In general, the heat check resistance is determined by high temperature strength, Young's modulus, thermal conductivity and thermal expansion coefficient and so forth. Namely, the heat check resistance can be determined by thermal stress caused due to variation of volume under the condition where thermal strain caused by material strength at thermal load is restrained. Through experiments, it was found that the most important factor to influence for heat check resistance is thermal conductivity. In other words, mere increasing of material strength was not effective for heat check resistance. To this, as set forth above, the higher thermal conductivity will substantially reduce the possibility of causing heat checks. However, on the other hand, increasing of the thermal conductivity may reduce the strength of the material. In order to compensate for the lowered strength, a reinforcement material has to be added. The reinforcement material to be added must have satisfactorily reinforcement capacity at a temperature range, in which heat checks may be occurred.

In view of the above, the composition of the graphite cast iron is determined as set forth above. Namely, C is a material for improving thermal conductivity. In order to obtain the desired thermal conductivity, the content of C has to be greater than or equal to 3.5 Wt %. On the other hand, if the amount of C is in excess of 4.0 Wt %, it may exceed eutectic crystallization point for causing precipitation of large grain size graphite and whereby causing lowering of strength. Therefore, the range of content of C is limited within the range of 3.5 Wt % to 4.0 Wt %. Si forms solid solution in the matrix to cause lowering of thermal conductivity. Therefore, the maximum content is 2.0 Wt %. On the other hand, in order to obtain fine and desired grain size of graphite precipitation and whereby to obtain satisfactorily high wear resistance, is required 1.6 Wt % or more of Si. Therefore, the range of content of Si is set in a range of 1.6 Wt % to 2.0 Wt %.

Mn is a material for providing sufficient strength of the material for use as a material for the movement of the friction device, such as disc rotor. In order to obtain sufficient strength, 0.5 Wt % or more of Mn is to be added to the matrix. On the other hand, if more than 0.8 wt % of Mn is added, MnS which affects toughness, can be precipitated in the matrix. Therefore, the preferred range of content is within a range of 0.5 Wt % to 0.8 Wt %. Mo is an essential additive for reinforcing strength for providing satisfactory heat check resistance. In order to have effective reinforcement of strength, minimum content of Mo is 0.4 Wt %. On the other hand, if more than 1.2 Wt % of Mo is added, carbides or casting defects can be created. Therefore, the preferred content range of Mo is 0.4 Wt % to 1.2 Wt %.

It was also found that by adding Ti, wear resistance can be enhanced. In order to obtain enhancement of wear resistance, 0.05 Wt % or more of Ti is to be added. On the other hand, if more than 0.10 Wt % of Ti is added, grain size of graphite becomes too small to hold satisfactory level of wear resistance. Therefore, the preferred range of Ti is 0.05 Wt % to 0.20 Wt %.

BRIEF DESCRIPTION OF THE DRAWINGS

The present invention will be understood more fully from the detailed description given herebelow and from the examples given herebelow and will be discussed with reference to the accompanying drawings.

In the drawings.

DETAILED DESCRIPTION OF THE INVENTION

Figure 1:
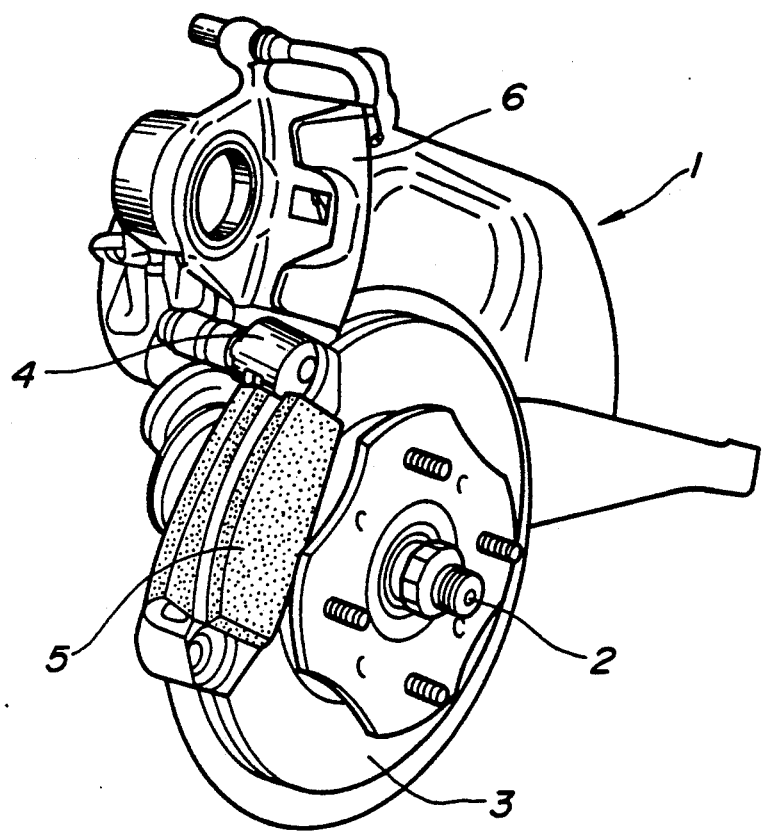
FIG. 1 is a perspective illustration of an automotive brake device as one example of application of a friction device according to the present invention.
Figure 2:
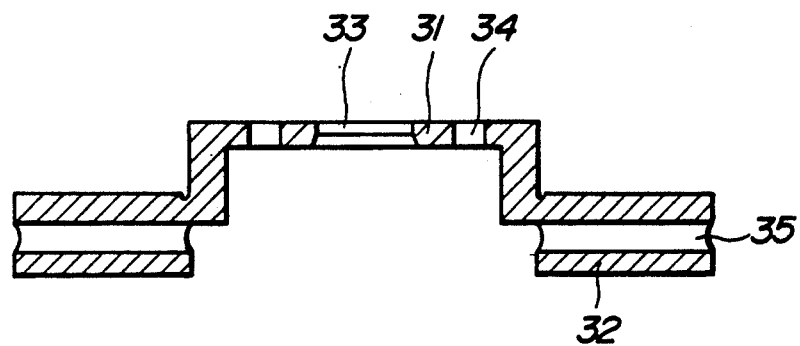
FIG. 2 is a section of a disc rotor employed in the brake device of FIG. 1.

The friction device according to the present invention will be discussed in greater detail with respect to an application for an automotive brake device. In the automotive brake assembly 1, a disc rotor 3 is designed to be rigidly secured to a wheel axle 2 for rotation therewith. This disc rotor 3 may form a movement of the friction device according to the invention. A brake pad 5 is carried by a caliper cylinder body and actuated by a hydraulic piston in the caliper cylinder. The brake pad 5 forms the active component of the friction device of the invention. As is well known, the brake pad 5 is depressed onto the friction surface of the disc rotor with a lining for establishing frictional engagement for converting rotational energy of the road wheel into heat energy for radiating into the atmosphere and whereby absorbing moving energy of the vehicle to decelerate. A reacting force on the brake pad 5 is absorbed by a torque member 4. As shown in FIG. 2, the disc rotor 3 has a center boss section 31 to engage with a wheel hub and an annular disc section 32. The boss section 31 is formed with a center opening 33 to receive a spindle of the wheel hub and bolt holes 34 for receiving wheel mounting bolts. On the other hand, the disc section is formed with cooling slot 35 for permitting air flow therethrough for cooling.

Such construction of disc-type automotive brake assembly is well known and would be unnecessary for discussing in further detail.

In order to demonstrate heat check resistance of the friction device of the invention, examples No. 1 through 6 as the disc rotor of graphitic cast iron were prepared. Chemical compositions and thermal conductivities of respective examples are shown in the following table III.

speed corresponding to the vehicular speed of 260 km/h for stopping within 30 sec. Braking test was repeated for hundred times. After brake test set forth above, check was performed utilizing dye for dying check or crack. The result is shown in FIG. 3.

Figure 3:
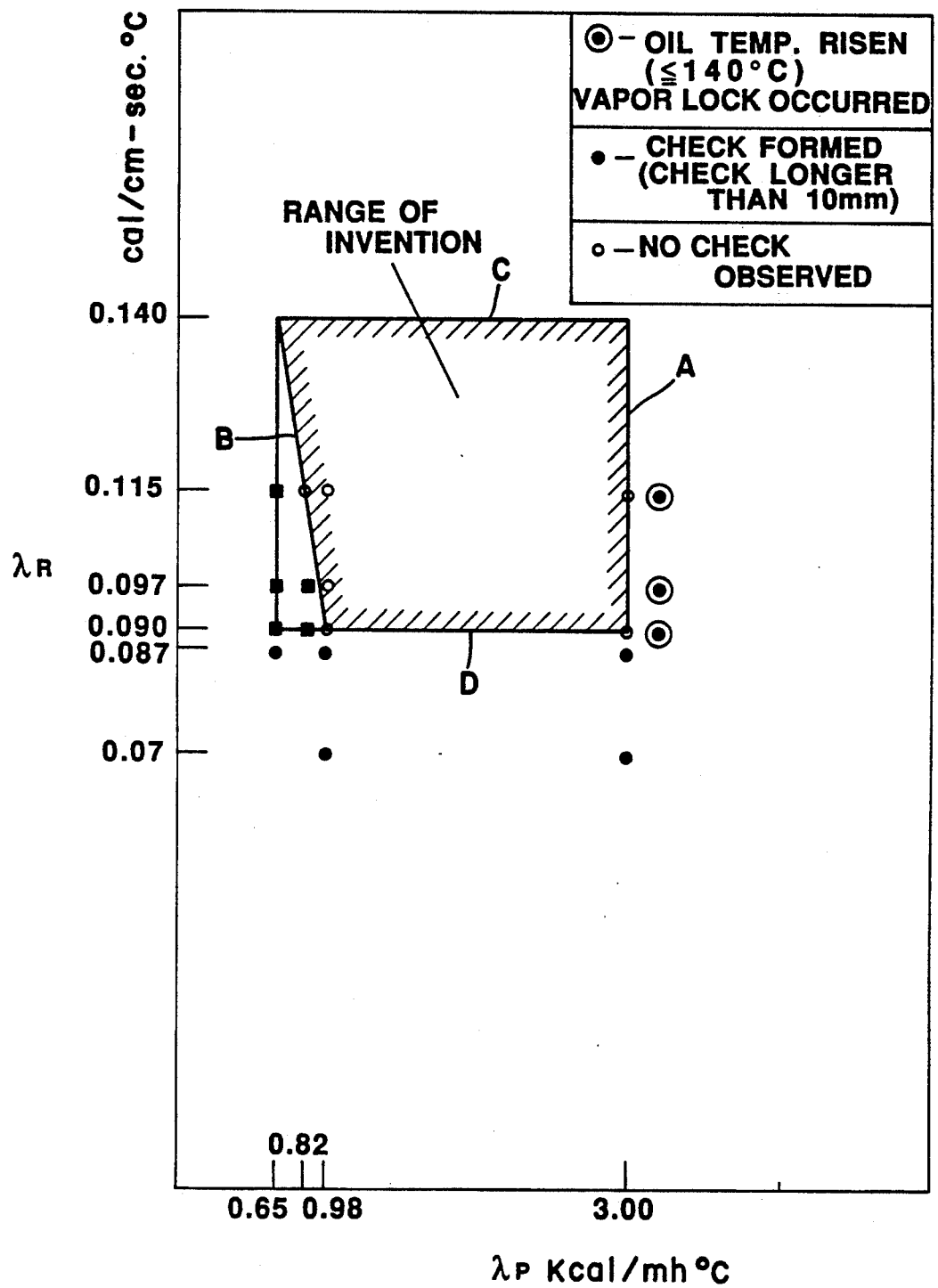
FIG. 3 is a chart showing relationship between conductivities $\lambda_R$ and $\lambda_P$ of the disc rotor and a brake pad in the brake device of FIG. 1.
Figure 4:
FIGS. 4 through 9 are microphotographies of examples No. 1, No. 2 and No. 3 and comparative examples No. 4, No. 5 and No. 6.
Figure 5:
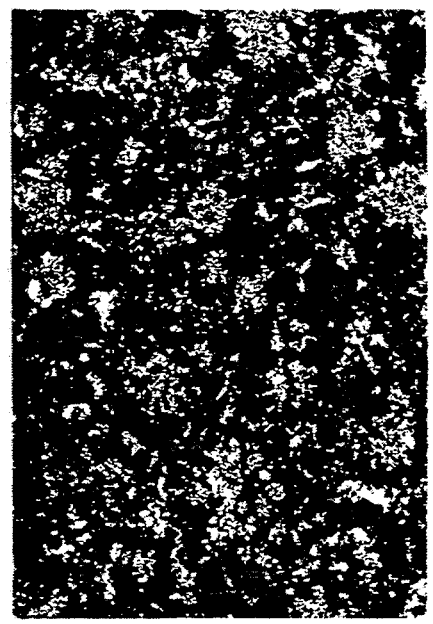
Figure 6:
Figure 7:
Figure 8:
Figure 9:
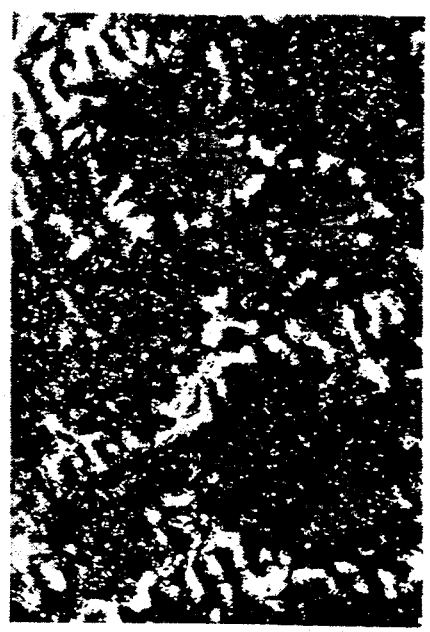

As can be seen from FIG. 3, heat check in the overall length of 10 mm was not observed in the examples satisfying the condition of the present invention, as shown by white circle. On the other hand, in the example including the disc rotor having thermal conductivity lower than 0.090 cal/cm.sec °C. check or crack in a length greater than or equal to 10 mm was formed as shown by black circle. On the other hand, in the example having thermal conductivity higher than 3.00 Kcal/mh°C., oil temperature in the hydraulic circuit was raised to lead vapor lock, as shown by double circle. Furthermore, when the thermal conductivity of the disc rotor is relatively low, check or crack longer than or equal to 10 mm was formed unless the thermal conductivity of the brake pad is sufficiently high, as shown by black square.

Therefore, by forming the disc rotor and brake pad satisfying the condition required in the invention as set forth above, satisfactorily high heat check resistance can be obtained for expanding life of the components of the brake device.

In order to select material composition for forming the disc rotor, experiments were also performed. In order to perform experiments, materials for examples No. 6, 7 and 8 and comparative examples 9, 10 and 11

TABLE III

| EXAM. No. | CHEMICAL COMPOSITION (Wt %) | | | | | | | | | $\lambda_R$ |
|---|---|---|---|---|---|---|---|---|---|---|
| | C | Si | Mn | Cu | Cr | Ni | Ti | Mo | Fe | |
| 1 | 3.66 | 1.91 | 0.68 | — | — | — | 0.01 | 0.42 | Rem | 0.115 |
| 2 | 3.68 | 1.80 | 0.67 | — | — | — | 0.01 | 1.20 | Rem | 0.090 |
| 3 | 3.65 | 1.72 | 0.62 | — | — | — | 0.08 | 0.62 | Rem | 0.097 |
| 4 | 3.37 | 2.33 | 0.62 | 0.14 | 0.04 | — | 0.02 | — | Rem | 0.087 |
| 5 | 3.19 | 1.83 | 0.75 | — | 0.71 | 2.49 | 1.01 | — | Rem | 0.070 |

* Example No. 4 is JIS FC25
* $\lambda_R$ : cal/cm. sec. °C.

Corresponding to the aforementioned examples No. 1 through No. 5, examples No. 1 through No. 5 of the brake pads of organic friction material were prepared. Types and thermal conductivity at normal temperature are shown in the following table IV.

TABLE IV

| EXAM. No. | TYPE | $\lambda_P$ |
|---|---|---|
| 1 | Low Steel | 0.65 |
| 2 | Asbestos | 0.82 |
| 3 | Asbestos | 0.98 |
| 4 | Low Steel | 3.00 |
| 5 | Low Steel | 3.20 |

Each pair of the disc rotor and brake pad were installed to a brake dynamo test machine and test was performed. Braking test was performed at a rotation are prepared according to the compositions as shown in the following table V.

TABLE V

| No. | CHEMICAL COMPOSITION | | | | | | | | | | FIG. |
|---|---|---|---|---|---|---|---|---|---|---|---|
| | C | Si | Mn | P | S | Mo | Cu | Cr | Ni | Ti | |
| EXAM. 6 | 3.66 | 1.91 | 0.68 | 0.12 | 0.05 | 0.42 | — | — | — | — | 4 |
| EXAM. 7 | 3.68 | 1.80 | 0.67 | 0.12 | 0.04 | 1.20 | — | — | — | — | 5 |
| EXAM. 8 | 3.65 | 1.72 | 0.62 | 0.11 | 0.04 | 0.62 | — | — | — | 0.8 | 6 |
| COMP. 9 | 3.37 | 2.33 | 0.62 | 0.11 | 0.13 | — | 0.14 | 0.04 | — | — | 7 |
| COMP. 10 | 2.58 | 1.61 | 0.61 | 0.10 | 0.03 | — | 5.85 | 2.38 | 12.1 | — | 8 |
| COMP. 11 | 3.19 | 1.83 | 0.75 | 0.10 | 0.05 | — | — | 0.71 | 2.49 | — | 9 |

Comparative Example No. 9: JIS FC25
Comparitive Example No. 10: Ni-resist

Utilizing the material listed in table V, the disc rotors for brake device as shown in FIG. 2 were formed. Structures of these example rotors were as shown in FIGS. 4 through 9. Matrix structure of these examples were pearlite.

For these examples, the brake test as set forth above was performed. For the brake test, a brake pad of low steel type formed of a steel fiber and aromatic polyimide (Keppler: tradename) fiber. The result of the brake test is shown in the following table VI.

TABLE VI

| No. | (1) | (2) | (3) | (4) | (5) | (6) | (7) |
|---|---|---|---|---|---|---|---|
| Exam. 6 | 13.9 | 8.5 | Nil | 0.005 | 0.35 | 0.115 | $2.92 \times 10^{-2}$ |
| Exam. 7 | 22.6 | 13.9 | Nil | 0.004 | 0.35 | 0.090 | $2.60 \times 10^{-2}$ |
| Exam. 8 | 16.1 | 9.9 | Nil | 0.001 | 0.38 | 0.097 | $2.82 \times 10^{-2}$ |
| Comp. 9 | 26.4 | 11.6 | 91 | 0.05 | 0.35 | 0.087 | $1.56 \times 10^{-2}$ |
| Comp. 10 | 27.6 | 16.9 | 1015 | 0.06 | 0.30 | 0.047 | $0.51 \times 10^{-2}$ |
| Comp. 11 | 39.3 | 21.5 | 137 | 0.03 | 0.33 | 0.070 | $0.98 \times 10^{-2}$ |

(1) Strength under normal Temperature (kgf/mm$^2$);
(2) Strength at 600° (kgf/mm$^2$);
(3) Crack ≧ 10 mm on the rotor surface (mm);
(4) Wear on the rotor surface (mm)
(5) Average friction coefficient between rotor and brake pad;
(6) Thermal conductivity at normal temperature (cal/cm. sec. °C.);
(7) Vibration damping ability ($Q^{-1}$)

As can be seen from the foregoing table VI, the examples Nos. 6, 7 and 8 exhibit much higher heat check resistance in comparison with that of the comparative example No. 9. On the other hand, the comparative examples Nos. 10 and 11, for which reinforcement additives are added for improving strength are lower heat check resistance in comparison with the comparative example No. 9. In addition, the rotor discs of the invention also exhibit higher wear resistance than the comparative examples. Particularly, the example No. 8, for which Ti is added, shows substantially high wear resistance.

On the other hand, as observed from the foregoing Table VI, the examples Nos. 6, 7 and 8 had friction coefficient equivalent to that of the comparative example No. 9 which corresponds to the conventionally known disc rotor formed of JIS FC25.

In addition, in order to check vibration damping performance, flat plate form test strips were obtained from respective disc rotors of examples Nos. 6, 7 and 8 and comparative examples Nos. 9, 10 and 11. Vibration damping performance of respective test strip was measured. The result is shown in the table VI. As can be seen from the result, the examples produced according to the invention has higher vibration damping performance than that of the comparative examples.

Referring again to FIG. 3, a closed area shadowed shows the optimum range of the thermal conductivity of the pad $\lambda_P$ for the thermal conductivity of the rotor $\lambda_R$. This area is enclosed by a vertical line segment A, an angled line segment B, as defined by the equation $\lambda_R = -0.152 \times \lambda_P + 0.24$, and two parallel horizontal line segments C and D. falling in this optimum range are the pad thermal conductivity $\lambda_P$ which falls in a range from a lower range of 0.65 to 0.98 Kcal/mh°C. to an upper limit of 3.00 Kcal/mh°C. against the rotor thermal conductivity $\lambda_R$ falling in a range from 0.09 to 0.140 cal/cm.sec.°C., and the lower range of the pad thermal conductivity $\lambda_P$ which falls in a range from 0.65 to 0.98 Kcal./mh°C. and which satisfies the following relationship against the rotor thermal conductivity falling in the range from 0.090 to 0.140 cal./cm.sec.°C., $$\lambda_R \geqq -0.152 \times \lambda_P + 0.24$$

What is claimed is:

1. A disc rotor for an automotive disc brake assembly, the disc rotor being made of graphite cast iron with a structure of pearlite, said graphite cast iron consisting essentially of:
   (a) 3.5 to 4.0 percent by weight of carbon,
   (b) 1.6 to 2.0 percent by weight of silicone,
   (c) 0.5 to 0.8 percent by weight of manganese,
   (d) 0.4 to 1.2 percent by weight of molybdenum, and
   (e) the remainder essentially iron.

2. A disc rotor as claimed in claim 1, wherein said graphite cast iron comprises flake graphite cast iron.

3. A disc rotor for an automotive disc brake assembly, the disc rotor being made of graphite cast iron with a structure of pearlite, said graphite cast iron consisting essentially of:
   (a) 3.5 to 4.0 percent by weight of carbon,
   (b) 1.6 to 2.0 percent by weight of silicone,
   (c) 0.5 to 0.8 percent by weight of manganese,
   (d) 0.4 to 1.2 percent by weight of molybdenum,
   (e) 0.05 to 0.10 percent by weight of titanium, and
   (f) the remainder essentially iron.

4. A disc rotor as claimed in claim 3, wherein said graphite cast iron comprises flake graphite cast iron.

5. An automotive disc brake assembly comprising:
   a disc rotor made of graphite cast iron with a structure of pearlite, and
   a brake pad frictionally engageable with said disc rotor, said brake pad being made of organic material,
   said graphite cast iron consisting essentially of
   (a) 3.5 to 4.0 percent by weight of carbon,
   (b) 1.6 to 2.0 percent by weight of silicone,
   (c) 0.5 to 0.8 percent by weight of manganese,
   (d) 0.4 to 1.2 percent by weight of molybdenum, and
   (e) the remainder essentially iron,
   said disc rotor having a first thermal conductivity falling in a range from 0.090 to 0.140 cal/cm-.sec.°C.,
   said brake pad having a second thermal conductivity falling in a range from a lower range of 0.65 to 0.98 Kcal/mh°C. to an upper limit of 3.00 Kcal/mh°C.,
   said lower range of said second thermal conductivity taking any value which is not less than 0.65 but which is less than 0.98 Kcal/mh°C. and which satisfies the following relationship against said first thermal conductivity falling in said range from 0.090 to 0.140 cal/cm.sec.°C., $$\lambda_R \geqq -0.152 \times \lambda_P + 0.24$$

where, $\lambda_R$ is said first thermal conductivity, and $\lambda_P$ is said second thermal conductivity.

6. An automotive disc brake assembly as claimed in claim 5, wherein said organic material is selected from at least one of the group consisting of asbestos, steel fiber, and aromatic polyimide.

7. An automotive disc brake assembly comprising:
   a disc rotor made of graphite cast iron with a structure of pearlite, and
   a brake pad frictionally engageable with said disc rotor, said brake pad being made of organic material,
   said graphite cast iron consisting essentially of
   (a) 3.5 to 4.0 percent by weight of carbon,
   (b) 1.6 to 2.0 percent by weight of silicone,
   (c) 0.5 to 0.8 percent by weight of manganese,
   (d) 0.4 to 1.2 percent by weight of molybdenum,
   (e) 0.05 to 0.10 percent by weight of titanium, and
   (f) the remainder essentially iron,
   said disc rotor having a first thermal conductivity falling in a range from 0.090 to 0.140 cal/cm-.sec.°C.,
   said brake pad having a second thermal conductivity falling in a range from a lower range of 0.65 to 0.98 Kcal/mh°C. to an upper limit of 3.00 Kcal/mh°C., said lower range of said second thermal conductivity taking any value which is not less than 0.65 but which is less than 0.98 Kcal/mh°C. and which satisfies the following relationship against said first thermal conductivity falling in said range from 0.090 to 0.140 cal/cm.sec.°C., $$\lambda_R \geq -0.152 \times \lambda_P + 0.24$$

where, $\lambda_R$ is said first thermal conductivity, and $\lambda_P$ is said second thermal conductivity.

8. An automotive disc brake assembly as claimed in claim 7, wherein said organic material is selected from at least one of the group consisting of asbestos, steel fiber, and aromatic polyimide.

9. A disc rotor for an automotive disc brake assembly, the disc rotor being made of graphite cast iron with a structure of pearlite, said graphite cast iron consisting essentially of:
   (a) 3.5 to 4.0 percent by weight of carbon,
   (b) 1.6 to 2.0 percent by weight of silicone,
   (c) 0.5 to 0.8 percent by weight of manganese,
   (d) up to 0.5 percent by weight of phosphorus,
   (e) 0.05 to 0.10 percent by weight of titanium, and
   (f) the remainder essentially iron.

10. An automotive disc brake assembly comprising:
   a disc rotor made of graphite cast iron with a structure of pearlite, and
   a brake pad frictionally engageable with said disc rotor, said brake pad being made of organic material,
   said graphite cast iron consisting essentially of
   (a) 3.5 to 4.0 percent by weight of carbon,
   (b) 1.6 to 2.0 percent by weight of silicone,
   (c) 0.5 to 0.8 percent by weight of manganese,
   (d) 0.4 to 1.2 percent by weight of molybdenum,
   (e) up to 0.5 percent by weight of phosphorus,
   (f) 0.05 to 0.10 percent by weight of titanium, and
   (g) the remainder essentially iron,
   said disc rotor having a first thermal conductivity falling in a range from 0.090 to 0.140 cal/cm.sec.°C.,
   said brake pad having a second thermal conductivity falling in a range from a lower range of 0.65 to 0.98 Kcal/mh°C. to an upper limit of 3.00 Kcal/mh°C.,
   said lower range of said second thermal conductivity taking any value which is not less than 0.65 but which is less than 0.98 Kcal/mh°C. and which satisfies the following relationship against said first thermal conductivity falling in said range from 0.090 to 0.140 cal/cm.sec.°C., $$\lambda_R \geq -0.152 \times \lambda_P + 0.24$$

where, $\lambda_R$ is said first thermal conductivity, and $\lambda_P$ is said second thermal conductivity.

* * * * *